No. 675,059. Patented May 28, 1901.
W. P. FLINT.
PROPORTIONAL FLUID METER.
(Application filed Nov. 1, 1900.)
(No Model.) 3 Sheets—Sheet 1.

WITNESSES:
Herbert Bradley.
F. E. Gaither.

INVENTOR
William P. Flint
By Bayard H. Christy
Att'y.

No. 675,059. Patented May 28, 1901.
W. P. FLINT.
PROPORTIONAL FLUID METER.
(Application filed Nov. 1, 1900.)

(No Model.) 3 Sheets—Sheet 2.

WITNESSES:
Herbert Bradley
F. E. Gaither

INVENTOR
William P. Flint
By Bayard H. Christy
Att'y.

No. 675,059. Patented May 28, 1901.
W. P. FLINT.
PROPORTIONAL FLUID METER.
(Application filed Nov. 1, 1900.)
(No Model.) 3 Sheets—Sheet 3.

WITNESSES:

INVENTOR
William P. Flint
By Bayard H. Christy
Att'y.

UNITED STATES PATENT OFFICE.

WILLIAM P. FLINT, OF PITTSBURG, PENNSYLVANIA.

PROPORTIONAL FLUID-METER.

SPECIFICATION forming part of Letters Patent No. 675,059, dated May 28, 1901.

Application filed November 1, 1900. Serial No. 35,116. (No model.)

*To all whom it may concern:*

Be it known that I, WILLIAM P. FLINT, a citizen of the United States, residing at Pittsburg, in the county of Allegheny and State of Pennsylvania, have invented or discovered certain new and useful Improvements in Proportional Fluid-Meters, of which improvements the following is a specification.

My invention relates to improvements in proportional meters adapted to measure fluids; and the object of my invention is to provide such a meter in which the losses in pressure which the two streams undergo in passing the two proportional valves shall be substantially equal, regardless of what the actual value of these losses may be and regardless of variation in the amount of pressure absorbed by the tally-meter.

Figure 1:
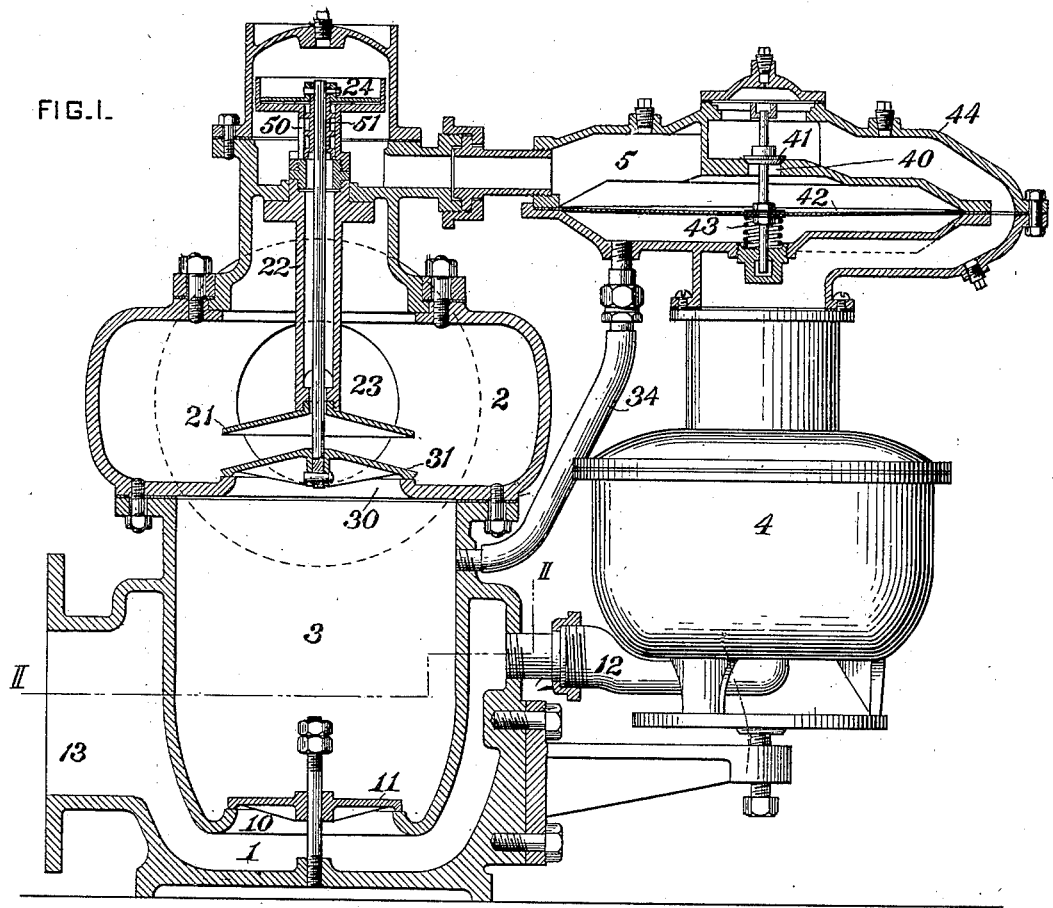
Figure 2:
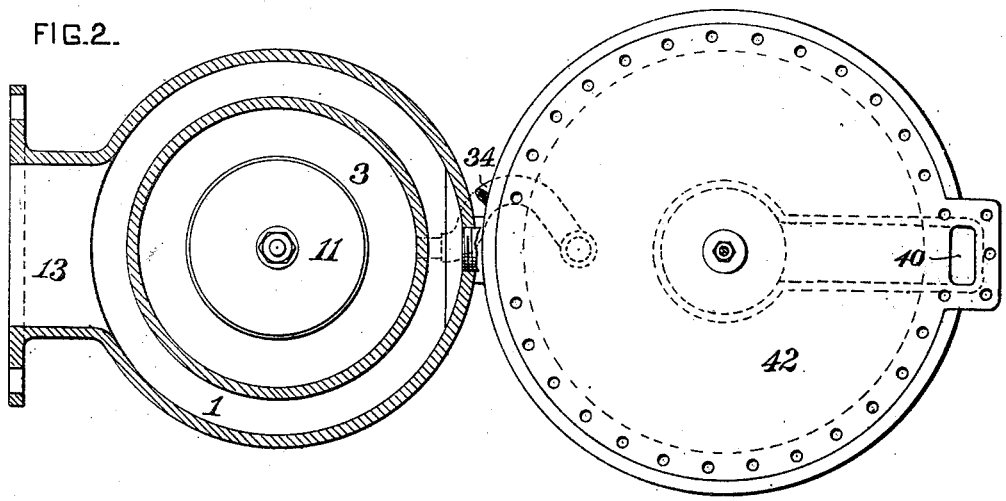
Figure 3:
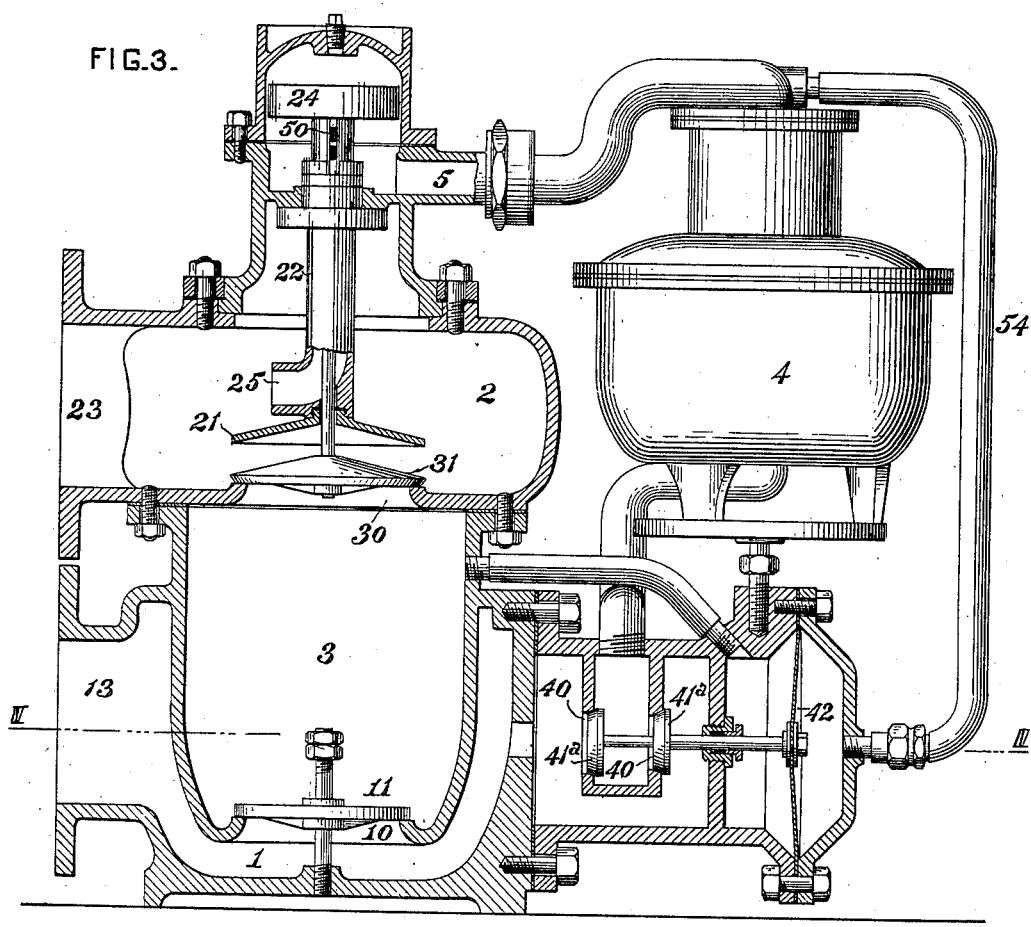
Figure 4:
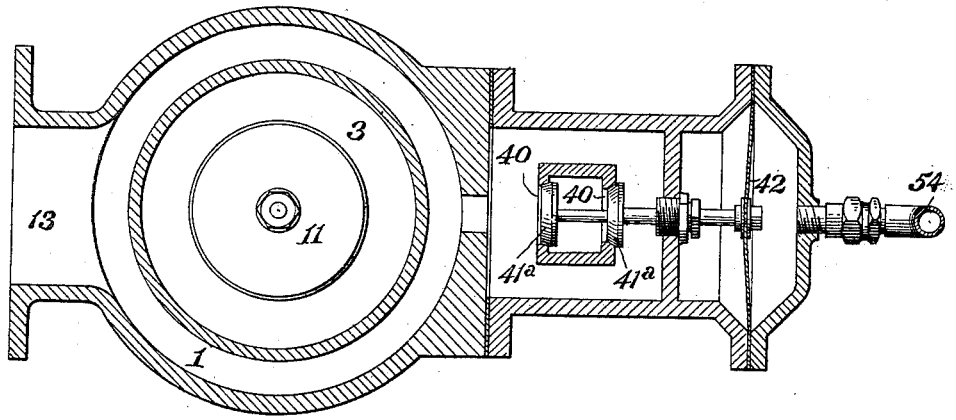
Figure 5:
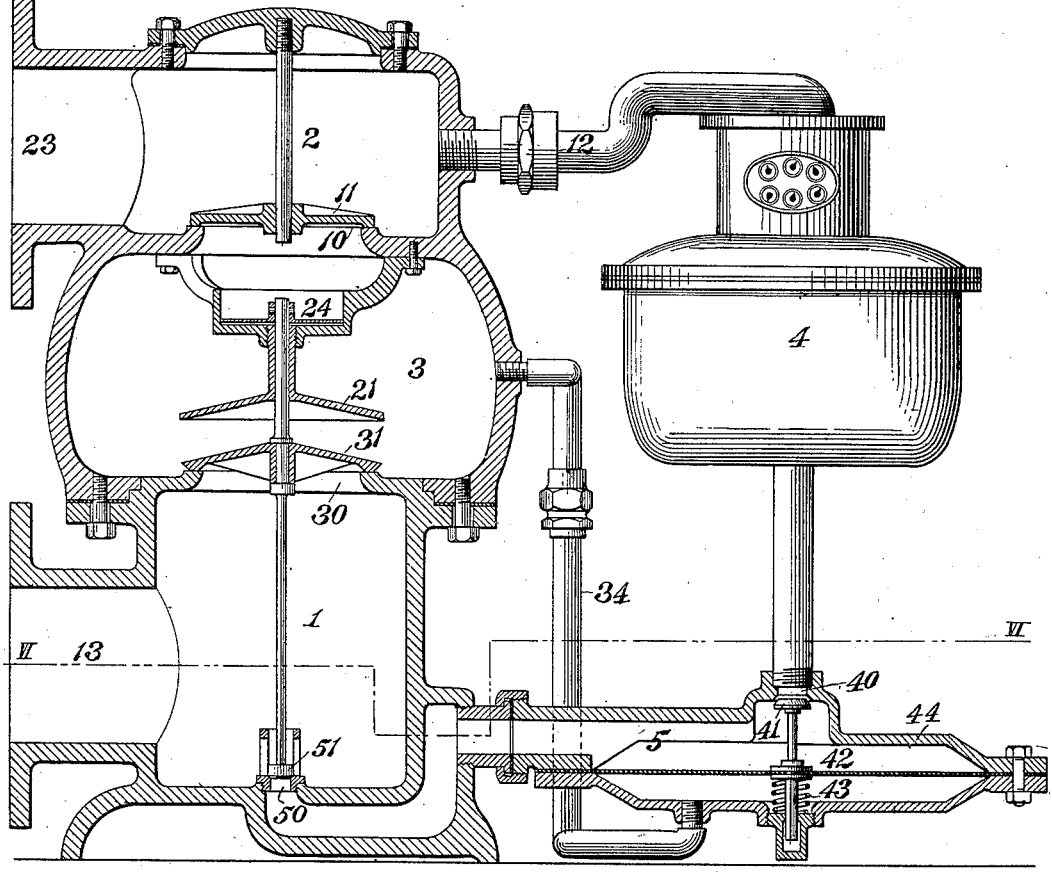
Figure 6:
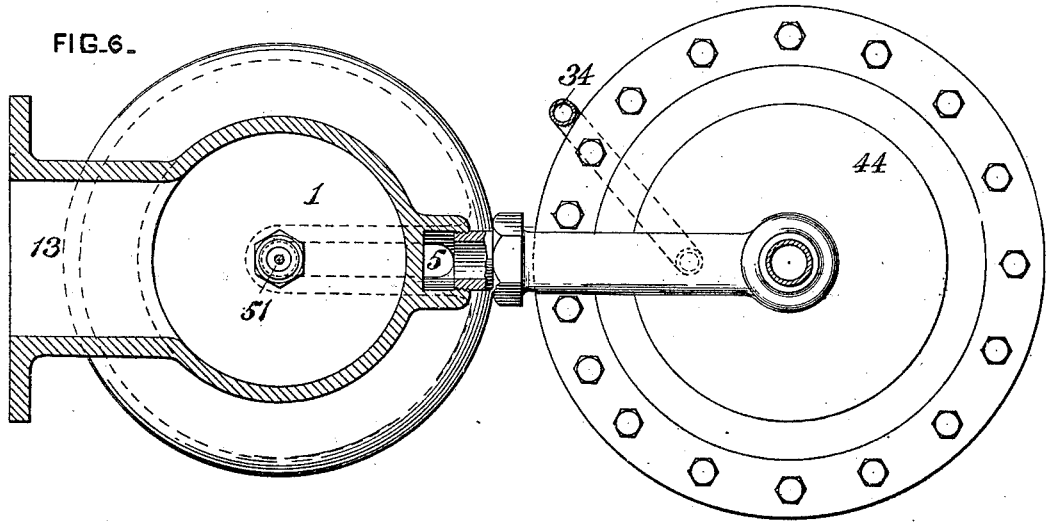

In the accompanying drawings, Figure 1 is a side view, partly in elevation and partly in section, of a proportional meter embodying my invention. Fig. 2 is a horizontal view, partly in section on the line II II, Fig. 1, and partly in elevation, casting 44, Fig. 1, being removed. Fig. 3 is a view similar to Fig. 1, showing certain modifications in matters of construction. Fig. 4 is a horizontal section on the line IV IV, Fig. 3. Fig. 5 is a view similar to Fig. 1, showing further modifications in matters of construction. Fig. 6 is a horizontal section on the line VI VI, Fig. 5.

In the several figures like numerals indicate like parts.

The apparatus consists, essentially, of an inlet-chamber 1, an outlet-chamber 2, a chamber 3 intermediate between the inlet and the outlet chambers and adapted to receive the larger or unmeasured stream of fluid, a measuring device 4, and an intermediate chamber 5, which, with their connections, form a separate line of flow for the smaller or measured stream of fluid from the inlet-chamber to the outlet-chamber. The measuring device 4 I shall here term the "tally-meter," both for convenience in reference and to distinguish it from the "meter," which is the term I apply to the apparatus as a whole. The forms of these various chambers as they appear in the drawings are not essential to my invention, and the tally-meter 4 may be of any preferred type. For the purposes of my present invention it is merely a chamber in which the amount of gas passing through it is recorded.

As shown in Figs. 1 to 4, fluid enters inlet-chamber 1 from the source of supply through passage 13. From chamber 1 the fluid passes in two streams. One stream enters intermediate chamber 3, the flow into that chamber being so controlled as to cause a definite loss in the pressure of the passing fluid. As shown in the drawings, the chambers are connected by a valve-governed port or passage 10. The other stream enters intermediate chamber 5 after passing through tally-meter 4 and a pressure-regulating valve 41 41$^a$, presently to be described. The two streams pass from the two intermediate chambers into a common outlet-chamber 2, the two flows being so controlled that the relative volumes of the two streams shall be constant. As shown in the drawings, the intermediate chambers 3 and 5 open into outlet-chamber 2 through valve-governed ports or passages 30 and 50.

Valve 11, which governs the port or passage 10 from inlet-chamber 1 to intermediate chamber 3, allows the fluid to pass with a definite but not necessarily invariable loss of pressure. Any suitable form or construction of valve or of valve-operating mechanism whereby this end is accomplished may be employed. A convenient construction for this purpose is shown in the drawings and consists in a puppet-valve which tends to descend to its seat against the flow of fluid from chamber 1. Fluid-pressure in chamber 1 tends to raise the valve. Fluid-pressure in chamber 3 and the gravity of the valve itself have the common tendency to close it. The valve stands in a state of equilibrium when these opposing forces are equal, and they are equal when the pressure in chamber 1 exceeds that in chamber 3 by a constant amount, represented by the weight of valve 11. Any reduction or increase of pressure in either chamber will cause the degree of opening of valve 11 to vary in such manner as to produce a corresponding reduction or increase of pressure in the other chamber. Thus under all operative conditions the pressure in chamber 1 exceeds that in chamber 3 by a definite amount. It will be presently explained that this loss in pressure must exceed the loss which the fractional or measured stream experiences in the tally-meter. So long as this is true it is not necessary that valve 11 shall consume an invariable amount of pressure under all operative conditions.

Fluid-pressure in intermediate chamber 5 is made equal to that which exists in intermediate chamber 3. In other words, the amount of pressure which the unmeasured stream loses in passing from inlet-chamber 1 through port or passage 10 into intermediate chamber 3 is the same as that which the measured stream loses in passing from inlet-chamber 1 to intermediate chamber 5. The measured stream, in passing from chamber 1 to chamber 5, passes through the tally-meter 4 and is measured. A loss in pressure occurs in the tally-meter, pressure being expended in driving it. This loss of pressure is variable in amount and cannot be predetermined. In practical operation there are numerous conditions which affect the amount, such as rate of flow, the collection of dirt, wear of the moving parts, temperature, and others. To overcome the inaccuracy which would otherwise be caused by fluctuation in the amount of pressure consumed in the tally-meter, another variable resistance is placed in the line of flow of the measured stream from the inlet-chamber 1 to the intermediate chamber 5 and is so arranged that when tally-meter resistance varies this varies inversely, and whatever be the resistance of the tally-meter the total fall in pressure which the measured stream undergoes in passing from inlet-chamber 1 to intermediate chamber 5 shall be the same as that which the unmeasured stream undergoes in passing from inlet-chamber 1 to intermediate chamber 3. A convenient construction for this purpose is shown in the drawings. It consists of an orifice 40, placed in the line of flow of the measured stream, and a movable pressure-plate 42, subject on one side to the pressure in chamber 3 and on the other to pressure in chamber 5, which by its movement controls the effective area of that orifice. I preferably employ a valve 41 41ª, adapted to be seated in the orifice and operatively connected to the movable pressure-plate, located as described. Since the pressure-plate is subject on its opposite sides to the pressures which exist in chambers 3 and 5, any change in condition which tends to cause the pressure in chamber 5 to vary and to become different from the pressure in chamber 3 will cause the pressure-plate 42 to move, and thus cause valve 41 to approach or recede from its seat, thus increasing or reducing the amount of pressure which the fluid loses in passing valve 41. If for any cause the resistance in the tally increases, there will be a tendency to a reduction of pressure in chamber 5. The pressure-plate will accordingly move so as increase the effective area of orifice 40, thus reducing the resistance at that point sufficiently to compensate for the increase in the tally-meter. Conversely, a diminution of resistance in the tally-meter will produce a corresponding increase of resistance at orifice 40. In other words, the unmeasured stream in passing from inlet-chamber to intermediate chamber 3 loses pressure at orifice 10. The measured stream in passing from inlet-chamber 1 to intermediate chamber 5 loses pressure at two points—in the tally-meter 4 and at orifice 40. The pressures in chambers 3 and 5 are equal. The loss of pressure at orifice 10 is then equal to the sum of the losses in tally-meter 4 and orifice 40. It is requisite to make the loss of pressure at 10 somewhat greater than the greatest loss which the tally-meter causes in practice. The loss of pressure at orifice 40 will then compensate for variation in tally-meter resistance. In this connection it may be observed that any variation in the fall of pressure at valve 11 (within operative limits) will not disturb the accuracy of the meter, since when such variation occurs a corresponding movement of pressure-plate 42 and of compensating valve 41 will occur, and the consequence will be that the pressures in chambers 3 and 5 will be maintained equal. The construction and arrangement of the parts which constitute this compensating device may be varied. It is only necessary that any tendency to a reduction of pressure in chamber 5 (without a corresponding reduction in chamber 3) shall increase the effective area of orifice 40, and, conversely, any tendency to an undue increase of pressure in chamber 5 shall diminish the effective area of that orifice. The valve 41 may be of any preferred type. In Fig. 1 it is shown as a puppet-valve. In Fig. 3 it is shown as a balanced valve 41ª. The pressure-plate is preferably a diaphragm, as shown. It is preferably placed in vertical position, as shown in Fig. 3. It may be otherwise arranged. In Fig. 1 it is placed in horizontal position, and when so placed that its weight and the weight of the parts connected with it shall not disturb the equality of the pressures in intermediate chambers 3 and 5 a counteracting device, such as spring 43, is inserted to sustain this weight. As shown in Fig. 1, the compensating orifice 40 is placed on the discharge side of the tally-meter, and as shown in Fig. 3 it is placed on the supply side. It is obvious from the foregoing that the relative positions of these parts is an immaterial matter and that whichever arrangement be adopted the same end will be accomplished. As shown in Fig. 1, the chamber beneath the pressure-plate is made continuous with intermediate chamber 3 by means of a pipe connection 34, and as shown in Fig. 3 the chamber to the right of the pressure-plate is made continuous with intermediate chamber 5 by means of a pipe connection 54. As I have stated, the forms of the chambers are immaterial to my invention. It is sufficient that the pressure-plate be subjected to the pressures existing in chambers 3 and 5, and to that end the pressure-plate may form part of the walls of the chambers proper, or the spaces on either side of it may communicate with those chambers through pipes, as may be convenient.

Fluid passes from the two intermediate chambers 3 and 5 through ports 30 and 50 into a common outlet-chamber 2. Since the pressures in chambers 3 and 5 are maintained equal and the discharge is into a common outlet, the falls in pressure across the two ports 30 and 50 are equal. The effective areas of these two ports are controlled by valves 31 and 51, which open in unison, and these valves are so adjusted that under all rates of flow and at all degrees of opening the volumes of the two streams shall bear a constant ratio to one another. A convenient construction for this purpose is shown in the drawings, where the valves are mounted on a common stem, and the weight of these valves and their connecting parts coacts with the pressure in outlet-chamber 2 to close the valves against the pressure in chamber 3 exerted beneath valve 31. The forms of the valves and the manner in which they are connected together may be varied, and any form of valve or of valve-controlling mechanism may be employed which will operate to produce a substantial fall in pressure from chambers 3 and 5 to chamber 2.

Since the fluid which passes valve 51 only is measured and since the relative values of the two streams is constant and known, the value of the entire flow may be readily computed from the readings of the tally-meter. Thus if the ratio which the two streams bear to one another is as one to ninety-nine the value of the entire flow will be one hundred times the value of the measured stream indicated in the tally-meter. This multiplication is customarily done by properly graduating the dial of the tally-meter.

13 and 23 indicate the inlet and outlet connections, respectively.

21 is a deflector-plate employed in connection with the type of valve shown at 31 in the drawings and placed above that valve, its purpose being to prevent eddy-currents in chamber 2 from disturbing the proper movement of valve 31.

22 is a conduit or pipe, also employed in connection with the type of valve shown at 31 in the drawings. It conveys the fluid passing from valve 51 down into chamber 2 and then through the curved extremity (shown at 25 in Fig. 4) into the line of discharge from chamber 2 to the outlet. The purpose of this pipe or conduit is to prevent the inflowing stream from valve 51 from being disturbed by the larger current issuing from valve 31.

24 is a dash-pot, which with the form of valves shown in the drawings acts as a cushioning device and prevents any "chattering" of valve 31 on its seat.

It is characteristic of my improved meter that the volume of gas delivered to the meter is divided into two streams and that means are provided for bringing both streams to substantially the same predetermined pressure and also for so regulating the flow of the two streams that their volumes therein bear a substantially constant ratio to one another. Hence it is immaterial whether the two streams are brought to a substantially equal pressure before or subsequent to their regulation as to flow. To this end the meter can be so arranged or connected to the supply and outlet ports that what has been termed herein the "outlet-port" may become the inlet-port, and vice versa, the valves being inverted in respect to the direction of seating. Such an arrangement is illustrated in Figs. 5 and 6. The operation of the parts as they there appear is this: Fluid enters inlet-chamber 1 as in the other form. From chamber 1 it passes in two streams through ports 30 and 50 into intermediate chambers 3 and 5. The effective areas of these two ports are controlled by the valves 31 and 51. The valves 31 and 51 are constructed as already described. Their operation differs in that in the forms already described fluid passes through them from two separate chambers, in which equal pressures are maintained, into one common chamber, while in the form now under consideration fluid passes through them from one common chamber into two separate chambers in which equal pressures are maintained. In each case, however, the two valves maintain the predetermined ratio between the two streams. The stream which enters intermediate chamber 3 through port 30 passes from chamber 3 into outlet-chamber 2 through port 10, controlled by the valve 11, which, constructed as before described, causes a definite though not necessarily invariable loss in the pressure of the passing fluid. The stream which enters the intermediate chamber 5 through port 50 passes through pressure-regulating valve 41 and tally-meter 4 into the outlet-chamber 2. Valve 41 and the means of operating it have already been described. The pressure-plate 42 is subject, as before, to the pressures in chambers 3 and 5. Pressures in chambers 3 and 5 are thus maintained equal, as before. The amount of pressure lost at valve 41 is variable, as before, and varies in such manner that the total loss which the fractional or measured stream undergoes in passing through it and through the tally-meter 4 shall be definite and always equal to the loss which the main stream undergoes in passing valve 11. It will also be plain in the light of what was said in respect to Fig. 3 that it is immaterial in respect to the form of Fig. 5 whether the fractional or measured stream passes first through valve 41 and then through tally-meter 4, as shown, or first through the tally-meter and then through the valve. Fig. 3 shows the former arrangement and Fig. 1 the latter.

I claim as my invention—

1. A proportional fluid-meter provided with an inlet and an outlet, and having two intermediate chambers arranged one in each line of flow from the inlet to the outlet; in combination with a tally-meter having its inlet and outlet arranged in one of the two lines of flow; means for effecting a reduction in the pressure of each stream; and proportional valves regulating the flow of each stream so that their volumes shall bear a substantially constant ratio to one another, substantially as described.

2. In a proportional fluid-meter, the combination of an inlet-chamber; an outlet-chamber; an intermediate chamber placed between the inlet and outlet chambers in the line of flow of the main or unmeasured stream; an intermediate chamber placed between the inlet and outlet chambers in the line of flow of the fractional or measured stream; a tally-meter having its inlet and outlet arranged between the inlet-chamber and the intermediate chamber in the line of flow of the fractional or measured stream; means for effecting a reduction in the pressure of the main or unmeasured stream in passing from the inlet-chamber to its intermediate chamber; means for effecting a reduction in the pressure of the fractional or measured stream in passing from the inlet-chamber to its intermediate chamber, whereby, when added to the reduction of pressure produced by the tally-meter, the pressures in the two intermediate chambers are made substantially equal; and proportional valves for securing a proportional flow through the two lines into the outlet-chamber, substantially as described.

3. In a proportional fluid-meter, the combination of an inlet-chamber; an outlet-chamber; an intermediate chamber placed between the inlet and outlet chambers in the line of flow of the main or unmeasured stream; an intermediate chamber placed between the inlet and outlet chambers in the line of flow of the fractional or measured stream; a pressure-reducing valve placed in the line of flow of the main or unmeasured stream from the inlet-chamber to its intermediate chamber; a tally-meter and a pressure-reducing valve placed in the line of flow of the fractional or measured stream from the inlet-chamber to its intermediate chamber; and proportional valves controlling the flow of fluid from the two intermediate chambers to the outlet chamber, substantially as described.

4. In a proportional fluid-meter, the combination of an inlet-chamber; an outlet-chamber; an intermediate chamber placed between the inlet and outlet chambers in the line of flow of the main or unmeasured stream; an intermediate chamber placed between the inlet and outlet chambers in the line of flow of the fractional or measured stream; a valve, placed between the inlet-chamber and the intermediate chamber in the line of flow of the main or unmeasured stream, and adapted to cause a loss in the pressure of the fluid passing from one chamber to the other; a tally-meter and a valve, placed between the inlet-chamber and the intermediate chamber in the line of flow of the fractional or measured stream; a movable pressure-plate, subjected on its opposite sides to the pressures which exist in the two intermediate chambers, controlling said valve; and proportional valves controlling the flow of the fluid from the two intermediate chambers to the common outlet-chamber, substantially as described.

5. In a proportional fluid-meter, the combination of an inlet-chamber; an outlet-chamber; an intermediate chamber placed between the inlet and outlet chambers in the line of flow of the main or unmeasured stream; an intermediate chamber placed between the inlet and outlet chambers in the line of flow of the fractional or measured stream; a tally-meter also placed between the inlet and outlet chambers in the line of flow of the fractional or measured stream; a pressure-reducing valve placed in the line of flow of the main or unmeasured stream; a pressure-reducing valve placed in the line of flow of the fractional or measured stream between the tally-meter and the intermediate chamber; and proportional valves controlling the flow of fluid in the two streams, substantially as described.

6. In a proportional fluid-meter, the combination of an inlet-chamber; an outlet-chamber; an intermediate chamber placed between the inlet and outlet chambers in the line of flow of the main or unmeasured stream; an intermediate chamber placed between the inlet and outlet chambers in the line of flow of the fractional or measured stream; a tally-meter placed between the inlet-chamber and the intermediate chamber in the line of flow of the fractional or measured stream; a pressure-reducing valve placed in the line of flow of the main or unmeasured stream from the inlet-chamber to its intermediate chamber; a pressure-reducing valve placed in the line of flow of the fractional or measured stream from the tally-meter to its intermediate chamber; and proportional valves controlling the flow of fluid from the two intermediate chambers to the outlet-chamber, substantially as described.

In testimony whereof I have hereunto set my hand.

WILLIAM P. FLINT.

Witnesses:
   JAMES B. YOUNG,
   F. M. DAPPER.